(12) United States Patent
Schimmel et al.

(10) Patent No.: US 6,288,173 B1
(45) Date of Patent: Sep. 11, 2001

(54) BLOCK COPOLYMERS

(75) Inventors: Karl F. Schimmel, Verona; Karen A. Barkac, Murrysville; Kurt A. Humbert, Allison Park; Jonathan D. Goetz, Sarver; James B. O'Dwyer, Valencia, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/325,227

(22) Filed: Jun. 3, 1999

(51) Int. Cl.$^7$ .................. C08F 297/00; C08F 220/34; C08F 220/28
(52) U.S. Cl. .................. 525/294; 525/94; 525/299; 526/320
(58) Field of Search .................. 525/94, 294, 299; 526/320

(56) References Cited

U.S. PATENT DOCUMENTS

| | | | |
|---|---|---|---|
| 5,212,245 | 5/1993 | Franks et al. | 525/223 |
| 5,219,945 | 6/1993 | Dicker et al. | |
| 5,272,201 | 12/1993 | Ma et al. | |
| 5,312,652 | 5/1994 | Antoine | |
| 5,508,349 | 4/1996 | Clark et al. | 525/124 |
| 5,552,487 | 9/1996 | Clark et al. | 525/131 |
| 5,621,059 | 4/1997 | Dupont et al. | 526/318.44 |
| 5,763,548 | 6/1998 | Matyjaszewski et al. | 526/135 |
| 5,789,487 | 8/1998 | Matyjaszewski et al. | 525/301 |
| 5,807,937 | 9/1998 | Matyjaszewski et al. | 526/135 |
| 5,859,113 | 1/1999 | McIntyre et al. | |

FOREIGN PATENT DOCUMENTS

| | | |
|---|---|---|
| 0 351 966 | 1/1990 | (EP) . |
| 279087 * | 10/1997 | (JP) . |
| WO 96/30421 | 10/1996 | (WO) . |
| WO 97/18247 | 5/1997 | (WO) . |
| WO 97/30131 | 8/1997 | (WO) . |
| WO 98/01480 | 1/1998 | (WO) . |
| WO 98/40415 | 9/1998 | (WO) . |

OTHER PUBLICATIONS

Brandrup "Polymer Handbook" pp. 198–204 of Chapter VI, Mar. 1999.*

Fox, *Bull. Amer. Physics Soc.*, 1,3 p. 123 (1956).

* cited by examiner

Primary Examiner—David J. Buttner
(74) Attorney, Agent, or Firm—William J. Uhl

(57) ABSTRACT

Block copolymers containing at least two blocks are provided and comprise: (a) a first block containing residues of at least one first ethylenically unsaturated radically polymerizable monomer that is free of hydroxy functionality, e.g., 2-ethylhexyl methacrylate, and a minor amount of at least one hydroxy functional ethylenically unsaturated radically polymerizable monomer, e.g., hydroxypropyl methacrylate; and (b) a second block containing residues of at least one second ethylenically unsaturated radically polymerizable monomer that is free of hydroxy functionality, e.g., iso-butyl methacrylate, and a minor amount of at least one hydroxy functional ethylenically unsaturated radically polymerizable monomer. The calculated Tg of the second monomer of the block copolymer is at least 20° C. greater than the calculated Tg of the first monomer.

29 Claims, No Drawings

BLOCK COPOLYMERS

FIELD OF THE INVENTION

The present invention relates to block copolymers comprising at least two blocks, a first block containing residues of a first radically polymerizable monomer and a minor amount of a hydroxy functional radically polymerizable monomer, and a second block containing residues of a second radically polymerizable monomer and a minor amount of a hydroxy functional radically polymerizable monomer. More particularly, the second monomer of the block copolymer of the present invention has a calculated glass transition temperature (Tg) of at least 20° C. greater than that of the first monomer.

BACKGROUND OF THE INVENTION

Block copolymers have unique properties and are used in a wide variety of applications, including, for example, as surfactants, dispersants and flow control agents. The unique properties of block copolymers are related to their well defined polymer chain architecture. Depending on the selection of monomers and synthetic method, block copolymers can be prepared with a plurality of segments or blocks having different preselected properties, e.g., hydrophilicity or polymer compatibility. While the skilled artisan can make certain general predictions as to the properties of a conceptualized block copolymer, the actual performance of such a copolymer typically can not be ascertained without experimental evaluations. This is particularly the case with flow control agents used in thermosetting coatings compositions, due in part to a complex set of indeterminate interactions that occur both within the composition and at the surface of the applied coating while it is being cured.

Coating compositions, e.g., liquid and powder coating compositions, are used extensively in a number of markets, e.g., the automotive, appliance and industrial markets. Coatings are often used to provide decorative qualities and/or corrosion protection to the substrates over which they are applied. Correspondingly, applied coatings are typically required to have at least a continuous defect free surface, and in the case of decorative finishes, also a very smooth surface. The automotive industry has particularly strict requirements as to the smoothness of the coatings that are used, as is the case with automotive clear top-coat compositions.

Coating compositions typically contain a flow control agent (also referred to as a flow modifier) to improve the appearance of the cured coating. Flow control agents have surface active properties and are thought to improve the appearance of a cured coating by altering the flow and leveling of the applied coating during its cure cycle. Flow control agents containing functional groups, e.g., carboxylic acid groups and/or hydroxyl groups, are known, and in addition to enhancing appearance, can also improve the adhesion of the coating to the substrate over which it is applied, and/or improve the adhesion or compatibility of a subsequently applied coating.

Coating compositions are typically required to provide optimum properties, e.g., appearance and/or corrosion resistance, at a minimum film thickness. For example, in the automotive industry, clear top-coats are typically required to have cured film thicknesses of no greater than 50 microns (2 mils). Advantages associated with coatings applied at lower film thickness include, for example, reduced material costs and weight gain of the coated ware, which is particularly desirable in the aircraft industry. However, as the film build of an applied coating composition is decreased, the appearance of the resulting cured coating typically diminishes, for example, as evidenced by lower measured gloss values.

In addition to the application of coatings at lower film builds, investigation and development in recent years has been directed towards reducing the environmental impact of coatings compositions, in particular that associated with emissions into the air of volatile organics during their use. Accordingly, interest in coatings having lower volatile organic content (VOC), e.g., powder coatings and high solids coatings, has been increasing. Powder coating compositions are free flowing particulate compositions that are substantially free of solvents. The appearance of powder coatings typically degrades rather precipitously with decreasing film thickness, e.g., at film thicknesses less than 75 microns (3 mils), and in particular at film thicknesses less than 50 microns (2 mils). In the absence of solvents that can enhance the flow and leveling of an applied coating, a flow control agent is a critical component in the majority of powder coating compositions.

It would be desirable to develop new block copolymers that can be used, for example, as flow control agents in coating compositions, such as liquid and powder coating compositions. In particular, it would be desirable to develop new block copolymers that can provide improved properties to the compositions into which they are incorporated, e.g., as with powder coating compositions applied at film thicknesses less than or equal to 50 microns.

U.S. Pat. No. 5,212,245 describes thermosetting powder coating compositions comprising a curable particulate resinous material and a flow control agent. The flow control agent of the '245 patent is described as a copolymer of an alkyl acrylate and/or alkyl methacrylate containing from 6 to 20 carbon atoms in the alkyl group, and a hydroxyalkyl acrylate and/or hydroxyalkyl methacrylate. The flow control agents of the '245 patent are not described as being either block copolymers or prepared by controlled or living radical polymerization methods.

International Patent Publication No. WO 97/30131 describes curable coating compositions comprising either a liquid or particulate curable film-forming resinous material and a flow control agent. The flow control agent of Publication No. WO 97/30131 is described as being a copolymer of at least one alkyl acrylate and/or alkyl methacrylate containing from 1 to 20 carbon atoms in the alkyl group, an amino functional acrylate and/or amino functional methacrylate, and optionally a hydroxyalkyl acrylate and/or hydroxyalkyl methacrylate. The flow control agents of Publication No. WO 97/30131 are described as being prepared by non-living free radical polymerization methods. U.S. Pat. Nos. 5,807,937, 5,789,487 and 5,763,548, and International Patent Publication Nos. WO 98/40415, WO 98/01480, WO 97/18247 and WO 96/30421 describe a radical polymerization process referred to as atom transfer radical polymerization (ATRP). The ATRP process is described as being a living radical polymerization that results in the formation of (co)polymers having predictable molecular weight and molecular weight distribution. The ATRP process is also described as providing highly uniform products having controlled structure (i.e., controllable topology, composition, etc.). The '937 patent also describes (co) polymers prepared by ATRP, which are useful in a wide variety of applications including, for example, with paints and coatings.

SUMMARY OF THE INVENTION

In accordance with the present invention, there is provided a block copolymer comprising:
 (a) a first block containing residues of at least one first ethylenically unsaturated radically polymerizable monomer that is free of hydroxy functionality, and a minor amount of at least one hydroxy functional ethylenically unsaturated radically polymerizable monomer; and
 (b) a second block containing residues of at least one second ethylenically unsaturated radically polymerizable monomer that is free of hydroxy functionality, and a minor amount of at least one hydroxy functional ethylenically unsaturated radically polymerizable monomer; wherein the calculated Tg of said second monomer is at least 20° C. greater than the calculated Tg of said first monomer.

Other than in the operating examples, or where otherwise indicated, all numbers expressing quantities of ingredients, reaction conditions, and so forth used in the specification and claims are to be understood as modified in all instances by the term "about."

DETAILED DESCRIPTION OF THE INVENTION

The block copolymer of the present invention contains at least two blocks, i.e., at least the first and second blocks as described above, in which each block has properties, e.g., calculated Tg, or monomer residue compositions that are distinct from those of its adjacent block(s). The block copolymer of the present invention is typically prepared by controlled radical polymerization, and accordingly, a block of monomer residues and its architecture is also defined by the composition of the monomer feed(s) used to prepare that block.

The term "controlled radical polymerization," as used herein and in the claims, refers to those methods of radical polymerization conducted in the presence of an initiator having a radically transferable group, e.g., a halogen, and a catalyst comprising a transition metal, which is capable of changing reversibly between lower and higher oxidation states during the polymerization, e.g., Cu(O) and Cu(I) or Cu(I) and Cu(II). Controlled radical polymerizations provide control over the molecular weight, polymer chain architecture and polydispersity of the resulting polymer, e.g., as is the case with ATRP. The number of polymer chains formed during a controlled radical polymerization is often nearly equal to the number of initiators present at the beginning of the reaction, and each polymer chain typically contains a residue of the initiator.

The polymer chain architecture of a polymer refers to the position of different monomer residues within the polymer chain or a segment of the polymer chain, e.g., random, gradient, alternating or block polymer chain architectures. For example, the residues of the first monomer and the hydroxy functional monomer may be present in the first block of the block copolymer in a random fashion, a gradient fashion, an alternating fashion and/or as blocks of first monomer residues and hydroxy functional monomer residues. The block copolymer may contain, for example, 2, 3, 4, 5 or more blocks. Typically, the block copolymer of the present invention contains 2 or 3 blocks.

When the block copolymer of the present invention contains more than two blocks, the first and second blocks may be adjacent to each other or separated by one or more additional blocks. The first and second blocks may be present in the block copolymer in any order, e.g., either of the first or second blocks may occur first relative to that portion of the block copolymer containing a residue of the polymerization initiator, i.e., the tail.

The gross polymer architecture of the block copolymer of the present invention is selected from linear copolymers, branched copolymers, hyperbranched copolymers, star copolymers, graft copolymers and mixtures thereof. Typically, the gross polymer architecture of the block copolymer of the present invention is selected from linear, branched and star copolymers, more typically it is that of a linear copolymer.

The first block of the block copolymer of the present invention is typically present in an amount of at least 5 percent by weight, preferably at least 10 percent by weight, and more preferably at least 15 percent by weight, based on total weight of the block copolymer. The first block is also typically present in an amount of less than 95 percent by weight, preferably less than 90 percent by weight, and more preferably less than 85 percent by weight, based on the total weight of the block copolymer. The first block is present in the block copolymer of the present invention in an amount ranging between any combination of these values, inclusive of the recited values.

The second block of the block copolymer of the present invention is typically present in an amount of at least 5 percent by weight, preferably at least 10 percent by weight, and more preferably at least 15 percent by weight, based on total weight of the block copolymer. The second block is also typically present in an amount of less than 95 percent by weight, preferably less than 90 percent by weight, and more preferably less than 85 percent by weight, based on the total weight of the block copolymer. The second block is present in the block copolymer of the present invention in an amount ranging between any combination of these values, inclusive of the recited values.

The weight ratio of the first block to the second block of the block copolymer of the present invention is typically from 0.05:1 to 19:1, e.g., from 0.1:1 to 9:1 or from 0.2:1 to 6:1. The block copolymer of the present invention typically has a number average molecular weight of from 500 to 100,000, e.g., from 1000 to 50,000 or from 5000 to 30,000. As used herein and in the claims, unless otherwise noted, values of number average molecular weight (Mn), weight average molecular weight (Mw) and z average molecular weight (Mz) are determined from gel permeation chromatography using polystyrene standards. Accordingly, values of Mn, Mw and Mz as presented herein do not represent absolute values, but rather averaged values relative to a set of polystyrene standards.

As used herein and in the claims, "calculated Tg" is determined in accordance with the method as described by Fox, in *Bull. Amer. Physics. Soc.*, 1,3 page 123 (1956). The calculated Tg of the second monomer of the block copolymer of the present invention, is typically at least 20° C. greater, preferably at least 30° C. greater, and more preferably at least 40° C. greater than the calculated Tg of the first monomer. Typically, the calculated Tg of the second monomer is also less than 235° C. greater than the calculated Tg of the first monomer, e.g., less than 150° C. or 100° C. greater than the calculated Tg of the first monomer. The difference in calculated Tg between the second and first monomers of the block copolymer of the present invention (i.e., the calculated Tg of the second monomer minus the calculated Tg of the first monomer) may range between any combination of these values, inclusive of the recited values.

The first and second monomers of the block copolymer of the composition of the present invention may each be selected independently from vinyl monomers, allylic monomers, olefins and mixtures thereof. Classes of vinyl monomers from which each of the first and second monomers may be independently selected include, but are not limited to, (meth)acrylates, vinyl aromatic monomers, vinyl halides and vinyl esters of carboxylic acids. As used herein and in the claims, by "(meth)acrylate" and like terms is meant methacrylates acrylates and mixtures of methacrylates and acrylates. Preferably, the first and second monomers are each independently selected from at least one of alkyl (meth)acrylates having from 1 to 20 carbon atoms in the alkyl group.

Specific examples of alkyl (meth)acrylates having from 1 to 20 carbon atoms in the alkyl group from which each of the first and second monomers may be independently selected include, but are not limited to, methyl (meth)acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate and 3,3,5-trimethylcyclohexyl (meth)acrylate. Examples of monomers having more than one (meth)acryloyl group, from which each of the first and second monomers may be independently selected, include, but are not limited to (meth)acrylic anhydride, diethyleneglycol bis(meth)acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

Specific examples of vinyl aromatic monomers from which each of the first and second monomers may be selected include, but are not limited to, styrene, p-chloromethylstyrene, divinyl benzene, vinyl naphthalene and divinyl naphthalene. Vinyl halides from which each of the first and second monomers may be independently selected include, but are not limited to, vinyl chloride and vinylidene fluoride. Vinyl esters of carboxylic acids from which each of the first and second monomers may be independently selected include, but are not limited to, vinyl acetate, vinyl butyrate, vinyl 3,4-dimethoxybenzoate and vinyl benzoate.

As used herein and in the claims, by "olefin" and like terms is meant unsaturated aliphatic hydrocarbons having one or more double bonds, such as obtained by cracking petroleum fractions. Specific examples of olefins from which each of the first and second monomers may be independently selected include, but are not limited to, propylene, 1-butene, 1,3-butadiene, isobutylene and diisobutylene.

As used herein and in the claims, by "allylic monomer(s)" is meant monomers containing substituted and/or unsubstituted allylic functionality, i.e., one or more radicals represented by the following general formula I,

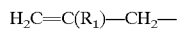

$$H_2C=C(R_1)-CH_2-$$      I wherein $R_1$ is hydrogen, halogen or a $C_1$ to $C_4$ alkyl group. Most commonly, $R_1$ is hydrogen or methyl and consequently general formula I represents the unsubstituted (meth)allyl radical. Examples of allylic monomers from which each of the first and second monomers may be independently selected include, but are not limited to: (meth)allyl ethers, such as methyl (meth)allyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers from which each of the first and second monomers may be independently selected include, but are not limited to: cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; and diesters of ethylenically unsaturated dibasic acids, e.g., diethyl maleate.

In a preferred embodiment of the present invention, the first monomer of the block copolymer is selected from iso-decyl (meth)acrylate, lauryl (meth)acrylate, n-octyl (meth)acrylate, 2-ethylhexyl (meth)acrylate, n-butyl acrylate, iso-butyl acrylate, ethyl acrylate and mixtures thereof. In a particularly preferred embodiment of the present invention, the first monomer is 2-ethylhexyl (meth)acrylate.

In a preferred embodiment of the present invention, the second monomer of the block copolymer is selected from isobornyl (meth)acrylate, n-butyl methacrylate, iso-butyl methacrylate, ethyl methacrylate and mixtures thereof. In a particularly preferred embodiment of the present invention, the second monomer is selected from iso-butyl methacrylate.

Both the first and second blocks of the block copolymer of the present invention contain residues of a minor amount of at least one hydroxy functional ethylenically unsaturated monomer, in addition to the residues of the respective first and second monomers. The residue(s) of hydroxy functional monomer present in each of the first and second blocks may be the same or different, and may be present in the same or different amounts. As used herein and in the claims, by "hydroxy functional ethylenically unsaturated monomer" is meant to include monomers having hydroxy functionality, e.g., hydroxyalkyl (meth)acrylates, and monomers that can be converted to hydroxy functional residues (i.e., precursors of hydroxy functional monomer residues), examples of which include, vinyl esters of carboxylic acids, such as vinyl acetate, and epoxide functional monomers, such as glycidyl (meth)acrylate.

Residues of hydroxy functional ethylenically unsaturated monomers may independently occupy any position within each of the first and second blocks of the block copolymer of the present invention. The hydroxy functional monomer residues may be present independently in each of the first and second blocks in a random fashion; a gradient fashion; or as one or more blocks of hydroxy functional monomers occupying any position throughout the whole of either or both of the first and second blocks, e.g., at the beginning, middle and/or end of the first block. In the case when the first and second blocks are adjacent to one another and each further contains an adjacent block of hydroxy functional monomer residues, the first and second blocks are defined by the monomer feeds used in their preparation, as discussed previously herein.

The first and second blocks of the block copolymer of the present invention each contain residues of hydroxy functional ethylenically unsaturated radically polymerizable monomer in amounts independently selected from at least 1 percent by weight, preferably at least 2 percent by weight, and more preferably at least 3 percent by weight, based on the total weight of the respective first and second blocks. Residues of the hydroxy functional ethylenically unsaturated radically polymerizable monomer are also present in the first and second blocks of the block copolymer in an amounts selected independently from less than 20 percent by weight, preferably less than 15 percent by weight, and more preferably less than 10 percent by weight, based on the total weight of the respective first and second blocks. The amount of residues of hydroxy functional monomer that are present in each of the first and second blocks may range independently between any combination of these values, inclusive of the recited values.

In an embodiment of the present invention the hydroxy functional ethylenically unsaturated monomer is selected from hydroxyalkyl (meth)acrylates having from 2 to 20 carbon atoms in the alkyl group; epoxide functional ethylenically unsaturated radically polymerizable monomers, which are hydrolyzed either prior to or after polymerization; hydroxyalkyl (meth)acrylates having from 2 to 20 carbon atoms in the alkyl group, which are reacted with one or more lactones either prior to or after polymerization; beta-hydroxy ester functional (meth)acrylates, which are the reaction product of (i) (meth)acrylic acid and a glycidyl ester of a saturated monocarboxylic acid having from 4 to 26 carbon atoms, or (ii) glycidyl (meth)acrylate and a saturated monocarboxylic acid having from 4 to 26 carbon atoms; and mixtures thereof. As used herein and in the claims, the term "saturated" as in "saturated monocarboxylic acid" is intended to denote the absence of ethylenic unsaturation but is not intended to exclude aromatic unsaturation as found, for example, in a benzene ring. A preferred saturated monocarboxylic acid is isostearic acid, and a preferred glycidyl ester of a saturated monocarboxylic acid is available commercially from Shell Chemical Company as CARDURA E glycidyl ester.

In a preferred embodiment of the present invention, the hydroxyalkyl (meth)acrylate is selected from hydroxyethyl (meth)acrylate, hydroxypropyl (meth)acrylate, hydroxybutyl (meth)acrylate and mixtures thereof; the epoxide functional monomer is selected from the group consisting of glycidyl (meth)acrylate, 3,4-epoxycyclohexylmethyl (meth) acrylate, 2-(3,4-epoxycyclohexyl)ethyl (meth)acrylate, allyl glycidyl ether and combinations thereof; the lactone is selected from the group consisting of β-propiolactone, β-butyrolactone, γ-butyrolactone, α-methyl-γ-butyrolactone, δ-valerolactone, γ-lactone, γ-caprolactone, ε-caprolactone and mixtures thereof; and the beta-hydroxy ester functional (meth)acrylate is the reaction product of glycidyl (meth)acrylate and isostearic acid. In a particularly preferred embodiment of the present invention, the hydroxy functional monomer is hydroxypropyl (meth)acrylate.

The block copolymer of the present invention may optionally have a block containing residues of at least one amine functional ethylenically unsaturated radically polymerizable monomer and a minor amount of at least one hydroxy functional ethylenically unsaturated radically polymerizable monomer. The amine functional monomer may have amine functionality selected from primary amine (—NH$_2$), secondary amine (—N(R$_2$)H), tertiary amine (—N(R$_2$) (R$_3$)) and combinations thereof, wherein R$_2$ and R$_3$ are each independently selected from C$_1$–C$_{20}$ linear or branched alkyl, C$_5$–C$_8$ cyclic alkyl, aromatic groups and polycyclic aromatic groups. Typically, R$_2$ and R$_3$ are each selected independently from C$_1$–C$_{20}$ linear or branched alkyl, e.g., C$_1$–C$_4$ alkyl.

The amine functional ethylenically unsaturated radically polymerizable monomer may be selected from aminoalkyl (meth)acrylates having from 2 to 20 carbon atoms in the alkyl group. Preferably, the amine group of the amine functional monomer is a tertiary amine, and the amine functional monomer is selected from di(C$_1$–C$_4$)aminoalkyl (meth)acrylates, e.g., di(C$_1$–C$_4$)aminoethyl (meth)acrylates. In a preferred embodiment of the present invention, the amine functional monomer is dimethylaminoethyl (meth) acrylate.

The hydroxy functional monomer of the block containing residues of amine functional monomer may be selected from one or more of those hydroxy functional monomers or hydroxy functional monomer precursors as recited and described previously herein with respect to the first and second blocks. Residues of hydroxy functional monomer may be present in the block containing residues of amine functional monomer in an amount ranging between any combination of those values as recited previously herein with respect to the first and second blocks, inclusive of the recited values. The hydroxy functional monomer residues may occupy any position in the block containing amine functional monomer residues, as discussed previously herein with respect to the first and second blocks.

When the block copolymer of the present invention has a block containing residues of amine functional monomer and a minor amount of residues of hydroxy functional monomer, the block containing residues of amine functional monomer and a minor amount of residues of hydroxy functional monomer is present in an amount of at least 1 percent by weight, preferably at least 5 percent by weight, and more preferably at least 10 percent by weight, based on the total weight of the block copolymer. The block containing residues of amine functional monomer and a minor amount of residues of hydroxy functional monomer may also be present in an amount of less than 35 percent by weight, preferably less than 28 percent by weight, and more preferably less than 20 percent by weight, based on the total weight of the block copolymer. The block containing residues of amine functional monomer and a minor amount of residues of hydroxy functional monomer may be present in the block copolymer of the present invention in an amount ranging between any combination of these values, inclusive of the recited values.

Residue(s) of the amine functional monomer can be present in either the first or second blocks, or alternatively may be present in a separate block of the block copolymer of the present invention. Preferably, the block containing residues of at least one amine functional monomer and a minor amount of residues of at least one hydroxy functional monomer is present as a block separate from the first and second blocks, e.g., being present as a third block, in which case the first and second blocks are free of residues of amine functional monomers.

The amine functional monomer residues are typically present in the block containing amine functional monomer residues in an amount of at least 50 percent by weight, preferably at least 70 percent by weight, and more preferably at least 80 percent by weight, based on the total weight of monomer residues in the block that are other than hydroxy functional monomer residues. In a particularly preferred embodiment of the present invention, the amine functional monomer residues comprise 100 percent by weight of those monomer residues that are other than hydroxy functional monomer residues in the block containing amine functional monomer residues.

In a preferred embodiment of the present invention, the controlled radical polymerization method used to prepare the block copolymer is atom transfer radical polymerization (ATRP). The ATRP method is described as a "living polymerization," i.e., a chain-growth polymerization that propagates with essentially no chain transfer and essentially no chain termination. The molecular weight of a polymer prepared by ATRP can be controlled by the stoichiometry of the reactants, i.e., the initial concentration of monomer(s) and initiator(s). In addition, ATRP also provides polymers having characteristics including, for example, narrow molecular weight distributions, e.g., polydispersity index values (PDI) less than 2.5, and well defined polymer chain structure, e.g., block copolymers and alternating copolymers.

The ATRP process can be described generally as comprising: polymerizing one or more radically polymerizable monomers in the presence of an initiation system; forming a polymer; and isolating the formed polymer. The initiation system comprises: an initiator having a radically transferable atom or group; a transition metal compound, i.e., a catalyst, which participates in a reversible redox cycle with the initiator; and a ligand, which coordinates with the transition metal compound. The ATRP process is described in further detail in U.S. Pat. Nos. 5,807,937, 5,789,487 and 5,763,548.

In preparing the block copolymer of the present invention by ATRP, the initiator may be selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable group, which is typically a halo group. The initiator may also be substituted with functional groups, e.g., oxyranyl groups, such as glycidyl groups. Additional useful initiators and the various radically transferable groups that may be associated with them (e.g., cyano, cyanato, thiocyanato and azido groups) are described in U.S. Pat. No. 5,807,937 at column 17, line 4 through column 18, line 28.

Polymeric compounds (including oligomeric compounds) having radically transferable groups may be used as ATRP initiators, and are herein referred to as "macroinitiators." Examples of macroinitiators include, but are not limited to, polystyrene prepared by cationic polymerization and having a terminal halide, e.g., chloride, and a polymer of 2-(2-bromopropionoxy) ethyl acrylate and one or more alkyl (meth)acrylates, e.g., butyl acrylate, prepared by conventional non-living radical polymerization. Macroinitiators can be used in the ATRP process to prepare graft polymers, such as grafted block copolymers and comb copolymers. A further discussion of macroinitiators is found in U.S. Pat. No. 5,789,487 at column 13, line 27 through column 18, line 58.

Preferably, the ATRP initiator may be selected from the group consisting of halomethane, methylenedihalide, haloform, carbon tetrahalide, 1-halo-2,3-epoxypropane, methanesulfonyl halide, p-toluenesulfonyl halide, methanesulfonyl halide, p-toluenesulfonyl halide, 1-phenylethyl halide, $C_1$–$C_6$-alkyl ester of 2-halo-$C_1$–$C_6$-carboxylic acid, p-halomethylstyrene, mono-hexakis (α-halo-$C_1$–$C_6$-alkyl) benzene, diethyl-2-halo-2-methyl malonate and mixtures thereof. Particularly preferred ATRP initiators are diethyl-2-bromo-2-methyl malonate and p-toluenesulfonyl chloride.

Catalysts that may be used in the ATRP preparation of the block copolymer of the present invention, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula II,

$$TM^{n+}X_n \qquad \qquad II$$

wherein TM is the transition metal, n is the formal charge on the transition metal having a value of from 0 to 7, and X is a counterion or covalently bonded component. Examples of the transition metal (TM) include, but are not limited to, Cu, Fe, Au, Ag, Hg, Pd, Pt, Co, Mn, Ru, Mo, Nb and Zn. Examples of X include, but are not limited to, halogen, hydroxy, oxygen, $C_1$–$C_6$-alkoxy, cyano, cyanato, thiocyanato and azido. A preferred transition metal is Cu(I) and X is preferably halogen, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, Cu(II)Cl$_2$ when Cu(I)Cl is used. Additional catalysts useful in preparing the block copolymer of the present invention are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the block copolymer of the present invention, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. A preferred class of ligands are the substituted bipyridines, e.g., 4,4'-dialkyl-bipyridyls. Additional ligands that may be used in preparing block copolymer of the present invention are described in U.S. Pat. No. 5,807,937 at column 18, line 57 through column 21, line 43.

In the ATRP preparation the block copolymer of the present invention, the amounts and relative proportions of initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the block copolymer can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5\times10^{-2}$:1.

In preparing the block copolymer of the present invention by ATRP methods, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

The block copolymers of the present invention may be prepared in the absence of solvent, i.e., by means of a bulk polymerization process. Generally, the block copolymer is prepared in the presence of a solvent, typically water and/or an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitriles, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, and mixed aromatic solvents such as those commercially available from Exxon Chemical America under the trademark SOLVESSO.

Additional solvents are described in further detail in U.S. Pat. No. 5,807,937 at column 21, line 44 through column 22, line 54.

The ATRP preparation of the block copolymer of the present invention is typically conducted at a reaction temperature within the range of 25° C. to 140° C., e.g., from 50° C. to 100° C., and a pressure within the range of 1 to 100 atmospheres, usually at ambient pressure. The atom transfer radical polymerization is typically completed in less than 24 hours, e.g., between 1 and 8 hours.

When the block copolymer is prepared by ATRP in the presence of a solvent, the solvent is typically removed after the polymer has been formed, by appropriate means as are known to those of ordinary skill in the art, e.g., vacuum distillation. Alternatively, the block copolymer may be precipitated out of the solvent, filtered, washed and dried according to known methods. After removal of, or separation from, the solvent, the block copolymer typically has a solids (as measured by placing a 1 gram sample in a 110° C. oven for 60 minutes) of at least 95 percent, and preferably at least 98 percent, by weight based on total polymer weight.

The ATRP transition metal catalyst and its associated ligand are typically separated or removed from the block copolymer prior to it use as, for example, a flow control agent. Removal of the ATRP catalyst is achieved using known methods, including, for example, adding a catalyst binding agent to the a mixture of the polymer, solvent and catalyst, followed by filtering. Examples of suitable catalyst binding agents include, for example, alumina, silica, clay or a combination thereof. A mixture of the polymer, solvent and ATRP catalyst may be passed through a bed of catalyst binding agent. Alternatively, the ATRP catalyst may be oxidized in situ, the oxidized residue of the catalyst being retained in the block copolymer.

The block copolymer may be selected from the group consisting of linear polymers, branched polymers, hyperbranched polymers, star polymers, graft polymers and mixtures thereof. The form, or gross architecture, of the block copolymer can be controlled by the choice of initiator and monomers used in its preparation. Linear block copolymers may be prepared by using initiators having one or two radically transferable groups, e.g., diethyl-2-halo-2-methyl malonate and α,α'-dichloroxylene in the case of preparation by ATRP. Branched block copolymers may be prepared by using branching monomers, i.e., monomers containing radically transferable groups or more than one ethylenically unsaturated radically polymerizable group, e.g., 2-(2-bromopropionoxy)ethyl acrylate, p-chloromethylstyrene and diethyleneglycol bis(methacrylate) in the case of preparation by ATRP. Hyperbranched block copolymers may be prepared by increasing the amount of branching monomer used.

Star block copolymers may be prepared using initiators having three or more radically transferable groups, e.g., hexakis(bromomethyl)benzene in the case of preparation by ATRP. Block copolymers in the form of graft polymers may be prepared using a macroinitiator, as previously described herein. Graft, branched, hyperbranched and star polymers are described in further detail in U.S. Pat. No. 5,807,937 at column 31, line 40 through column 38, line 55.

Gradient copolymers can be prepared from two or more monomers by ATRP methods, and are generally described as having architecture that changes gradually and in a systematic and predictable manner along the polymer backbone. Gradient copolymers can be prepared by ATRP methods by (a) varying the ratio of monomers fed to the reaction medium during the course of the polymerization, (b) using a monomer feed containing monomers having different rates of polymerization, or (c) a combination of (a) and (b). Gradient copolymers are described in further detail in U.S. Pat. No. 5,807,937 at column 29, line 29 through column 31, line 35.

The block copolymer of the present invention may be further described as containing at least one of the following representative polymer chain structures III and IV:

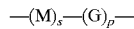   III and

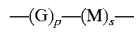   IV wherein M is a residue of at least one first ethylenically unsaturated radically polymerizable monomer that is free of hydroxy functionality, and a minor amount of at least one hydroxy functional ethylenically unsaturated radically polymerizable monomer; G is a residue of at least one second ethylenically unsaturated radically polymerizable monomer that is free of hydroxy functionality, and a minor amount of at least one hydroxy functional ethylenically unsaturated radically polymerizable monomer; said second monomer having a calculated Tg of at least 30° C. greater than the calculated Tg of said first monomer; s and p represent average numbers of residues occurring in a block of residues; s and p are each independently from 3 to 100 for each structure.

With reference to polymer chain structures III and IV, the first and second ethylenically unsaturated radically polymerizable monomers are the same as the first and second monomers described previously herein. In an embodiment of the present invention, one of either the first or second monomer is selected from amine functional ethylenically unsaturated radically polymerizable monomers as described previously herein, e.g., dimethylaminoethyl (meth)acrylate, and a minor amount of hydroxy functional monomer, e.g., hydroxypropyl (meth)acrylate.

With further reference to general polymer chain structures III and IV, M represents one or more types of first monomer residues that are free of hydroxy functionality, and a minor amount of residues of hydroxy functional monomer, while p represents the average total number of M residues occurring per block of M residues (M-block). The —(M)$_s$— portion of general structures III and IV represents (1) a diblock of first monomer residues and hydroxy functional monomer residues, (2) an alternating block of first monomer residues and hydroxy functional monomer residues, (3) a polyblock of first monomer residues and hydroxy functional monomer residues, or (4) a gradient block of first monomer residues and hydroxy functional monomer residues.

For purposes of illustration, when the M-block is prepared from, for example, 7 moles of 2-ethylhexyl methacrylate (2-EHA) and 3 moles of hydroxypropyl methacrylate (HPMA), the —(M)$_s$— portion of general structures III and IV may represent, depending on the conditions of preparation, as is known to one of ordinary skill in the art: (a) a diblock of 7 residues of 2-EHA and 3 residues of HPMA having a total of 10 residues (i.e., s=10); (b) a random block of 7 residues of 2-EHA and 3 residues of HPMA having a total of 10 residues; or (c) an alternating block of 3 residues of 2-EHA and 3 residues of HPMA and a homoblock of 4 residues of 2-EHA having a total of 10 residues. Accordingly, the —(G)$_p$— portions of general structures III and IV and —(E)$_q$— portions of the following general structures may each be described in a manner similar to that of the —(M)$_s$— portions provided above.

Each of the first and second monomers may be selected from more than one monomer species, and the residues of these different monomer species may form various architectures separate from that of the residues of the hydroxy functional monomer in these blocks. For example, when the M-block contains a gradient of more than one species of first monomer residue, e.g., 5 residues of a first monomer $M_1$ and 5 residues of a first monomer $M_2$, and a block of hydroxy functional monomer residues, e.g., a block of three hydroxy functional monomer residues $M_{OH}$, the —$(M)_s$— portion of general structures III and IV may be represented more specifically by the following general structure V:

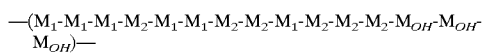

The block copolymer of the present invention may be additionally described as containing at least one of the following representative polymer chain structures VI–XI:

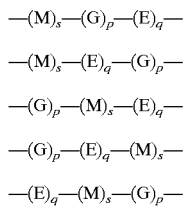

and

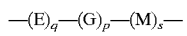

in which E is a residue of at least one amine functional ethylenically unsaturated radically polymerizable monomer and a minor amount of at least one hydroxy functional ethylenically unsaturated radically polymerizable monomer; M and G are as previously described herein and are each free of residues of amine functional ethylenically unsaturated radically polymerizable monomer; q represents average numbers of residues occurring in a block of residues; and q is independently from 3 to 100 for each structure.

When the block copolymer of the present invention is prepared by atom transfer radical polymerization in the presence of an initiator having a radically transferable group, the block copolymer may be further additionally described as having at least one of the following representative polymer chain structures XII–XVII:

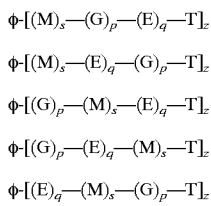

and

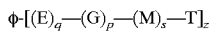

n which M, G and E are as described previously herein; φ is or is derived from the residue of said initiator free of said radically transferable group; T is or is derived from said radically transferable group of said initiator; z is at least equal to the number of radically transferable groups of the initiator and is independently for each structure at least 1, e.g., from 1 to 100 or from 1 to 5. In a preferred embodiment of the present invention, z of polymer chain structures XII–XVII is 1.

Symbol T of polymer structures XII–XVII is or is derived from the radically transferable group of the initiator. For example, when the polymeric block copolymer is prepared in the presence of diethyl-2-bromo-2-methyl malonate, T may be the radically transferable bromo group.

The radically transferable group may optionally be (a) removed or (b) chemically converted to another moiety. In either of (a) or (b), the symbol T is considered herein to be derived from the radically transferable group of the initiator. The radically transferable group may be removed by substitution with a nucleophilic compound, e.g., an alkali metal alkoxylate. However, in the present invention, it is desirable that the method by which the radically transferable group is either removed or chemically converted also be relatively mild.

In an embodiment of the present invention, when the radically transferable group is a halogen, the halogen can be removed by means of a mild dehalogenation reaction. The reaction is typically performed as a post-reaction after the block copolymer has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen terminated block copolymer of the present invention with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound). As used herein, by "halogen terminated" and similar terms is meant to be inclusive also of pendent halogens, e.g., as would be present in branched, comb and star polymers.

Not intending to be bound by any theory, it is believed, based on the evidence at hand, that the reaction between the halogen terminated block copolymer and one or more LRPEU compounds results in (1) removal of the terminal halogen group, and (2) the addition of at least one carbon-carbon double bond where the terminal carbon-halogen bond is broken. The dehalogenation reaction is typically conducted at a temperature in the range of 0° C. to 200° C., e.g., from 0°C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of terminal halogen present in the block copolymer. When added in excess of a stoichiometric amount, the LRPEU compound is typically present in an amount of no greater than 5 mole percent, e.g., 1 to 3 mole percent, in excess of the total moles of terminal halogen.

Limited radically polymerizable ethylenically unsaturated compounds useful for dehalogenating the block copolymer of the present invention under mild conditions include those represented by the following general formula XVIII.

XVIII

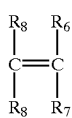

In general formula XVIII, $R_6$ and $R_7$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_6$ and $R_7$ groups is an organo group while the other can be an organo group or hydrogen. For instance when one of $R_6$ or $R_7$ is an alkyl group, the other can be an alkyl, aryl, acyloxy, alkoxy, arenes, sulfur-containing alkyl group, or nitrogen-containing alkyl and/or nitrogen-containing aryl groups. The $R_8$ groups can be the same or different groups selected from hydrogen or lower alkyl selected such that the reaction between the terminal halogen of the block copolymer and the LRPEU compound is not prevented. Also an $R_8$ group can be joined to the $R_6$ and/or the $R_7$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4,4-trimethyl-1-pentene).

For purposes of illustration, the reaction between halogen terminated block copolymer and LRPEU compound, e.g., alpha-methyl styrene, is summarized in the following general scheme 1.

General Scheme 1

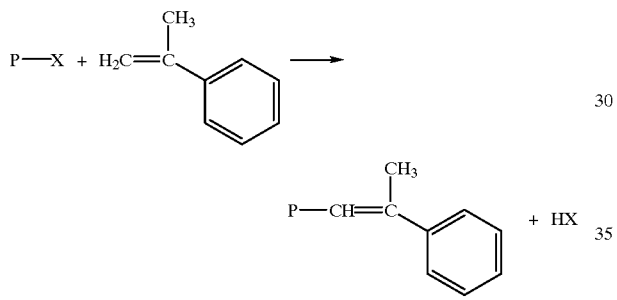

In general scheme 1, P-X represents the halogen terminated block copolymer.

The block copolymers of the present invention may be used as additives in a number of applications, including for example, adhesives, coatings, engineering plastics and rubber compositions. The block copolymers of the present invention are particularly useful as flow control agents in coating compositions, e.g., powder coating compositions.

The present invention is more particularly described in the following examples, which are intended to be illustrative only, since numerous modifications and variations therein will be apparent to those skilled in the art. Unless otherwise specified, all parts and percentages are by weight.

SYNTHESIS EXAMPLES A–C

Synthesis Examples A and B describe the preparation of block copolymers of the present invention, while synthesis Example C describes the preparation of a comparative random copolymer. The copolymers of Examples A–C were used as flow control agents in the powder coating compositions of Examples 1–3. In synthesis Examples A–C the following monomer abbreviations are used: hydroxypropyl methacrylate (HPMA); iso-butyl methacrylate (IBMA); 2-ethylhexyl methacrylate (2-EHMA); and dimethylaminoethyl methacrylate (DMAEMA). The monomers of synthesis Examples A–C were used as received from the supplier, i.e., they were not further purified prior to use. In the following synthesis examples, percent monomer conversions were determined by measuring (at 110° C./1 hour) the percent weight solids of free monomer present in 0.2 gram samples removed from the reaction vessels, and subtracting this value from 100. The block copolymer structures shown in each of Examples A and B are representative general block copolymer formulas.

EXAMPLE A

A triblock copolymer according to the present invention was prepared by controlled radical polymerization from the ingredients as enumerated in the following Table A. The triblock copolymer of this example is summarized as follows:

(IBMA/HPMA)-(2-EHMA/HPMA)-(DMAEMA/HPMA)

TABLE A

| Ingredients | Parts by weight |
| --- | --- |
| Charge 1 | |
| toluene | 250.0 |
| copper powder (a) | 4.4 |
| 2,2'-bipyridyl | 10.9 |
| p-toluenesulfonyl chloride | 13.3 |
| magnesium silicate (b) | 10.0 |
| Charge 2 | |
| IBMA | 230.0 |
| HPMA | 11.6 |
| Charge 3 | |
| 2-EHMA | 230.0 |
| HPMA | 8.4 |
| Charge 4 | |
| DMAEMA | 40.0 |
| HPMA | 1.62 |
| Charge 5 | |
| toluene | 200.0 |
| Charge 6 | |
| magnesium silicate (b) | 50.0 |

(a) The copper powder had an average particle size of 25 microns, a density of 1 gram/cm³, and was obtained commercially from OMG Americas.
(b) MAGNESOL synthetic magnesium silicate obtained commercially from The Dallas Group of America.

Charge 1 was added to a 2 liter 4-necked flask equipped with a motor driven stainless steel stir blade, water cooled condenser, and a heating mantle and thermometer connected through a temperature feed-back control device. The contents of the flask were heated to and held at 90° C. for one hour, after which Charge 2 was added continuously to the flask over a period of 30 minutes. The contents of the flask were maintained at 90° C. When the monomer conversion of Charge 2 as determined to have reached 99 percent, Charge 3 was added to the flask over a period of 30 minutes. With continued stirring at 90° C. for 4 hours, the monomer conversion of Charge 3 was found to be 99 percent, after which Charge 4 was added over a period of 10 minutes. After an additional 2 hour hold at 90° C., the monomer conversion was determined to be substantially complete. Charges 5 and 6 were added in succession, and the contents of the flask were passed through a filter-press packed with MAGNESOL synthetic magnesium silicate. The filtered resin was then vacuum stripped to a total weight solids of 99 percent (as determined from a 0.2 gram sample at 110° C./1 hour).

The triblock copolymer of Example A was found to have: Mn=10,301; Mn=18,456; z average molecular weight (Mz)=26,922; and a polydispersity index (PDI) (i.e., Mw/Mn)=1.8.

EXAMPLE B

A diblock copolymer according to the present invention was prepared by controlled radical polymerization from the ingredients as enumerated in the following Table B. The diblock Copolymer of this example is summarized as follows:

(IBMA/HPMA)-(2-EHMA/HPMA)

TABLE B

| Ingredients | Parts by weight |
| --- | --- |
| Charge 1 | |
| toluene | 250.0 |
| copper powder (a) | 4.4 |
| 2,2'-bipyridyl | 10.9 |
| p-toluenesulfonyl chloride | 13.3 |
| magnesium silicate (b) | 10.0 |
| Charge 2 | |
| IBMA | 230.0 |
| HPMA | 8.4 |
| Charge 3 | |
| 2-EHMA | 230.0 |
| HPMA | 11.6 |
| Charge 4 | |
| toluene | 400.0 |
| Charge 5 | |
| magnesium silicate (b) | 50.0 |

Charge 1 was added to a flask as described and equipped in Example A. The contents of the flask were maintained at 90° C. throughout the course of the synthetic procedure. One hour after adding Charge 1, Charge 2 was added to the flask over a period of 30 minutes. When the monomer conversion of Charge 2 was determined to have reached 99 percent, Charge 3 was added to the flask over a period of 30 minutes. Six hours after the completion of the addition of Charge 3, the monomer conversion was determined to be substantially complete. Charges 4 and 5 were added in succession, and the contents of the flask were passed through a filter-press packed with MAGNESOL synthetic magnesium silicate. The filtered resin was then vacuum stripped to a total weight solids of 99 percent.

The diblock copolymer of Example B was found to have: Mn=10,661; Mn=16,098; Mz=21,476; and a PDI=1.5.

EXAMPLE C

A comparative random copolymer was prepared by standard, i.e., non-controlled or non-living, radical polymerization from the ingredients as enumerated in the following Table C.

TABLE C

| Ingredients | Parts by weight |
| --- | --- |
| Charge 1 | |
| toluene | 250.0 |
| Charge 2 | |
| 1,1'-azobis(isobutylnitrile) (c) | 13.5 |
| toluene | 150.0 |
| Charge 3 | |
| IBMA | 230.0 |

TABLE C-continued

| Ingredients | Parts by weight |
| --- | --- |
| HPMA | 21.6 |
| 2-EHMA | 230.0 |
| DMAEMA | 40.0 |

(c) VAZO 67 free radical initiator obtained commercially from Du Pont Chemicals.

Charge 1 was added to a flask as described and equipped in Example A, and held at 80° C. for 1 hour, after which Charge 2 was added to the flask over a period of 2.5 hours. Ten minutes after the addition of Charge 2 was started, Charge 3 (a homogenous mixture of the listed monomers) was added to the flask over a period of 2 hours. The contents of the flask were maintained at 80° C. over the course of the additions of Charges 2 and 3. With the completion of the addition of Charge 2, the contents of the flask were vacuum stripped to a total weight solids of 99 percent.

The random copolymer of Example C was found to have: Mn=15,151; Mn=34,992; Mz=56,473; and a PDI=2.3.

POWDER COATING EXAMPLES 1–3

Thermosetting powder coating compositions were prepared from the ingredients as enumerated in Table 1.

TABLE 1

| Ingredients | Example 1 | Example 2 | Example 3 |
| --- | --- | --- | --- |
| Epoxy functional acrylic (d) | 1037.0 | 1037.0 | 1037.0 |
| DDDA (e) | 340.5 | 340.5 | 340.5 |
| Example A block copolymer | 15.0 | 0.0 | 0.0 |
| Example B block copolymer | 0.0 | 15.0 | 0.0 |
| Example C random copolymer | 0.0 | 0.0 | 15.0 |
| Benzoin | 3.0 | 3.0 | 3.0 |
| Wax (f) | 9.0 | 9.0 | 9.0 |
| UV Stabilizer 1 (g) | 30.0 | 30.0 | 30.0 |
| UV Stabilizer 2 (h) | 30.0 | 30.0 | 30.0 |
| Anti-yellowing additive (i) | 30.0 | 30.0 | 30.0 |
| Amine Catalyst (j) | 5.6 | 5.6 | 5.6 |

(d) A room temperature solid acrylic polymer prepared from (meth) acrylate monomers including glycidyl methacrylate and having an epoxy equivalent weight of 300 grams/equivalent.
(e) dodecanedioic acid.
(f) WAX C MICRO POWDER additive available commercially from Hoechst-Celanese, which describes it as ethylene bis-steroylamide.
(g) TINUVIN 144 ultraviolet light stabilizer available commercially from Ciba-Geigy Corp., which describes it as 2-tert-butyl-2-(4-hydroxy-3,5-di-tert-butylbenzyl)[bis(methyl-2,2,6,6-tetramethyl-4-piperidinyl)]dipropionate.
(h) CGL-1545 ultraviolet light stabilizer available commercially from Ciba-Geigy Corp., which describes it as 2-[4((2-hydroxy-3-(2-ethylhexyloxy)propyl)-oxy]-2-hydroxyphenyl)-4,6-bis(2,4-dimethylphenyl)-1,3,5-triazine.
(i) GCA-1 anti-yellowing agent commercially available from Sanko Chemical Corp.
(j) ARMEEN M2C amine catalyst available commercially from Akzo-Nobel Corp., which describes it as methyl dicocoamine.

The ingredients as enumerated in Table 1 were pre-blended in a Henshel dry blender for 60 to 90 seconds. The pre-blends were then melt-blended in a Werner & Pfleider co-rotating twin screw extruder to form a molten extrudate having a temperature of 100° C. to 125° C. The molten extrudate was pressed into a thin sheet, cooled and solidified on a set of chilled rollers, broken into smaller chips, milled and classified to form thermosetting clear powder coating compositions having an average particle size of from 17 to 27 microns.

Two sets of powder coated panels, having cured film thickness (CFT) of (a) 62–67 microns and (b) 47–51 microns, were prepared by electrostatic spray application of the powder coating compositions of Examples 1–3 over test panel substrates. The powder coating compositions were cured at 145° C. for 30 minutes. The test panel substrates were previously coated with a cured black electrocoat primer available from PPG Industries, Inc. as ED-5051 electroprimer. The appearance of the two sets of powder coated test panels was evaluated, and the results are summarized in Tables 2 and 3.

TABLE 2

Appearance of
Powder Coating Examples 1–3
Having Cured Film Thickness of 62–67 microns

| Test | Example 1 | Example 2 | Example 3 |
|---|---|---|---|
| CFT (k) | 64 | 67 | 62 |
| 20° Gloss Value (l) | 83 | 82 | 82 |
| Longwave Value (m) | 1.0 | 0.6 | 7.9 |
| Tension Value (n) | 19.3 | 19.8 | 14.6 |

(k) Cured film thickness of the applied powder coating clear coat, in units of microns.
(l) 20° gloss values were obtained using a BYK Gardner Haze-Gloss Meter in accordance with the manufacture's suggested method of operation.
(m) Longwave values were obtained using a BYK Wavescan Plus instrument in accordance with the manufacture's suggested method of operation. Longwave values of lesser magnitude are indicative of coatings that are smoother in appearance.
(n) Tension values were obtained using a BYK Wavescan Plus instrument in accordance with the manufacture's suggested method of operation. Tension values of greater magnitude are indicative of coatings that are smoother in appearance.

TABLE 3

Appearance of
Powder Coating Examples 1–3
Having Cured Film Thickness of 47–51 microns

| Test | Example 1 | Example 2 | Example 5 |
|---|---|---|---|
| CFT (k) | 51 | 47 | 50 |
| 20° Gloss Value (l) | 83 | 82 | 82 |
| Longwave Value (m) | 1.5 | 1.3 | 5.8 |
| Tension Value (n) | 18.7 | 19.0 | 15.6 |

The results as summarized in Tables 2 and 3 demonstrate the utility of the block copolymers of the present invention as flow control agents in thermosetting coating compositions. In addition, the results as summarized in Tables 2 and 3 show that thermosetting coating compositions containing block copolymers of the present invention, i.e., Examples 1 and 2, have appearance that is quantitatively better than that of coating compositions containing comparative random copolymers, i.e., Example 3. The thermosetting coating compositions of Examples 1 and 2 were also found to have appearance that was visually better, e.g., smoother, than that of the coating composition of Example 3.

The present invention has been described with reference to specific details of particular embodiments thereof. It is not intended that such details be regarded as limitations upon the scope of the invention except insofar as and to the extent that they are included in the accompanying claims.

We claim:
1. A block copolymer comprising:
(a) a first block containing residues of at least one first ethylenically unsaturated radically polymerizable monomer that is free of hydroxy functionality, and a minor amount of at least one hydroxy functional ethylenically unsaturated radically polymerizable monomer; and
(b) a second block containing residues of at least one second ethylenically unsaturated radically polymerizable monomer that is free of hydroxy functionality, and a minor amount of at least one hydroxy functional ethylenically unsaturated radically polymerizable monomer;
wherein the calculated Tg of said second monomer is at least 20° C. greater than the calculated Tg of said first monomer; and
wherein one of said first monomer and said second monomer is selected from at least one amine functional ethylenically unsaturated radically polymerizable monomer.
2. The block copolymer of claim 1 wherein said block copolymer has a number average molecular weight of from 500 to 100,000.
3. The block copolymer of claim 1 wherein the calculated Tg of said second monomer is at least 30° C. greater than the calculated Tg of said first monomer.
4. The block copolymer of claim 1 wherein said block copolymer is prepared by controlled radical polymerization.
5. The block copolymer of claim 4 wherein said block copolymer is prepared by atom transfer radical polymerization initiated in the presence of an initiator having at least one radically transferable group.
6. The block copolymer of claim 5 wherein said block copolymer contains a residue of said initiator free of said radically transferable group, and a residue of or derived from said radically transferable group, said initiator being selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable halide.
7. The block copolymer of claim 6 wherein said initiator is selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis (α-halo-$C_1$–$C_6$-alkyl)benzene, diethyl-2-halo-2-methyl malonate and mixtures thereof.
8. The block copolymer of claim 1 wherein said block copolymer is selected from the group consisting of linear copolymers, branched copolymers, hyperbranched copolymers, star copolymers, graft copolymers and mixtures thereof.
9. The block copolymer of claim 1 wherein said first block is present in an amount of from 5 percent by weight to 95 percent by weight, based on the total weight of said block copolymer, and said second block is present in an amount of from 5 percent by weight to 95 percent by weight, based on the total weight of said block copolymer.
10. The block copolymer of claim 1 wherein the weight ratio of said first block to said second block is from 0.05:1 to 19:1.

11. The block copolymer of claim 1 wherein said hydroxy functional monomer is present in said first block in an amount from 1 percent by weight to 20 percent by weight, based on the total weight of said first block, and said hydroxy functional monomer is present in said second block in an amount from 1 percent by weight to 20 percent by weight, based on the total weight of said second block.

12. The block copolymer of claim 1 wherein each of said first and second monomers are independently selected from vinyl monomers, allylic monomers, olefins and mixtures thereof.

13. The block copolymer of claim 12 wherein said first monomer is selected from the group consisting of isobornyl (meth)acrylate, n-butyl methacrylate, iso-butyl methacrylate, ethyl methacrylate and mixtures thereof.

14. The block copolymer of claim 12 wherein said second monomer is selected from the group consisting of iso-decyl (meth)acrylate, lauryl (meth)acrylate, n-octyl (meth)acrylate, 2-ethylhexyl (meth)acrylate, n-butyl acrylate, iso-butyl acrylate, ethyl acrylate and mixtures thereof.

15. A block copolymer comprising:
(a) a first block containing residues of at least one first ethylenically unsaturated radically polymerizable monomer that is free of hydroxy functionality, and a minor amount of at least one hydroxy functional ethylenically unsaturated radically polymerizable monomer;
(b) a second block containing residues of at least one second ethylenically unsaturated radically polymerizable monomer that is free of hydroxy functionality, and a minor amount of at least one hydroxy functional ethylenically unsaturated radically polymerizable monomer; wherein the calculated Tg of said second monomer is at least 20° C. greater than the calculated Tg of said first monomer; and
(c) a third block containing residues of at least one amine functional ethylenically unsaturated radically polymerizable monomer, and a minor amount of at least one hydroxy functional ethylenically unsaturated radically polymerizable monomer.

16. The block copolymer of claim 15 wherein said block containing residues of at least one amine functional ethylenically unsaturated radically polymerizable monomer, and a minor amount of at least one hydroxy functional ethylenically unsaturated radically polymerizable monomer is a third block, and each of said first and second blocks are free of residues of amine functional ethylenically unsaturated radically polymerizable monomer.

17. The block copolymer of claim 16 wherein said third block is present in an amount of from 1 percent by weight to 35 percent by weight, based on the total weight of said block copolymer.

18. The block copolymer of claim 16 wherein said hydroxy functional monomer is present in said third block in an amount from 1 percent by weight to 20 percent by weight, based on the total weight of said third block.

19. The block copolymer of claim 15 wherein said amine functional monomer is selected from the group consisting of di($C_1$–$C_4$ alkyl)aminoethyl (meth)acrylates and mixtures thereof.

20. The block copolymer of claim 15 wherein said hydroxy functional monomer is selected from the group consisting of: hydroxyalkyl (meth)acrylates having from 2 to 20 carbon atoms in the alkyl group; epoxide functional ethylenically unsaturated radically polymerizable monomers, which are hydrolyzed; hydroxyalkyl (meth)acrylates having from 2 to 20 carbon atoms in the alkyl group, which are reacted with a lactone; bet-hydroxy ester functional (meth)acrylates, which are the reaction product of (i) (meth)acrylic acid and a glycidyl ester of a saturated monocarboxylic acid having from 4 to 26 carbon atoms, or (ii) glycidyl (meth)acrylate and a saturated monocarboxylic acid having from 4 to 26 carbon atoms; and mixtures thereof.

21. The block copolymer of claim 10 wherein said hydroxyalkyl (meth)acrylate is selected from hydroxyethyl (meth)acrylate, hydroxypropyl (meth)acrylate, hydroxybutyl (meth)acrylate and mixtures thereof; said epoxide functional monomer is selected from the group consisting of glycidyl (meth)acrylate, 3,4-epoxycyclohexylmethyl (meth)acrylate, 2-(3,4-epoxycyclohexyl)ethyl (meth)acrylate, allyl glycidyl ether and combinations thereof; said lactone is selected from the group consisting of β-propiolactone, β-butyrolactone, γ-butyrolactone, α-methyl-γ-butyrolactone, δ-valerolactone, γ-lactone, γ-caprolactone, ε-caprolactone and mixtures thereof; and said beta-hydroxy ester functional (meth)acrylate is the reaction product of glycidyl (meth)acrylate and isostearic acid.

22. A block copolymer containing at least one of the following polymer chain structures:

$$—(M)_s—(G)_p—$$

and $$—(G)_p—(M)_s—$$

wherein M is a residue of at least one first ethylenically unsaturated radically polymerizable monomer that is free of hydroxy functionality, and a minor amount of at least one hydroxy functional ethylenically unsaturated radically polymerizable monomer; G is a residue of at least one second ethylenically unsaturated radically polymerizable monomer that is free of hydroxy functionality, and a minor of at least one hydroxy functional ethylenically unsaturated radically polymerizable monomer; said second monomer having a calculated Tg of at least 20° C. greater than the calculated Tg of said first monomer; s and p are each independently from 3 to 100 for each structure; and wherein one of said first monomer and said second monomer is selected from at least one amine functional ethylenically unsaturated radically polymerizable monomer.

23. A block copolymer containing at least one of the following polymer chain structures:

$$—(M)_s—(G)_p—(E)_q—$$
$$—(M)_s—(E)_q—(G)_p—$$
$$—(G)_p—(M)_s—(E)_q—$$
$$—(G)_p—(E)_q—(M)_s—$$
$$—(E)_q—(M)_s—(G)_p—$$

and $$—(E)_q—(G)_p—(M)_s—$$

wherein M is a residue of at least one first ethylenically unsaturated radically polymerizable monomer that is free of hydroxy functionality, and a minor of at least one hydroxy functional ethylenically unsaturated radically polymerizable monomer; G is a residue of at least one second ethylenically unsaturated radially polymerizable monomer that is free of hydroxy functionality, and a minor of at least one hydroxy functional ethylenically unsaturated radically polymerizable monomer; E is a residue of at least one amine functional ethylenically unsaturated radically polymerizable monomer, and a minor amount of at least one hydroxy functional ethylenically unsaturated radically polymerizable monomer; each of M and G are free of residues of amine functional ethylenically unsaturated radically polymerizable monomer; said second monomer having a calculated Tg of at least 20° C. greater than the calculated Tg of said first monomer; s and p are each independently from 3 to 100 for each structure; q represents average numbers of residues occurring in a block of residues; and q is independently from 3 to 100 for each structure.

24. The block copolymer of claim 23 wherein said block copolymer is prepared by controlled radical polymerization.

25. The block copolymer of claim 24 wherein said block copolymer is prepared by atom transfer radical polymerization in the presence of an initiator having a radically transferable group, said block copolymer having at least one of the following representative polymer chain structures:

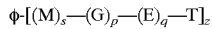

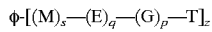

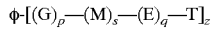

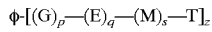

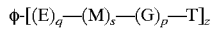

and

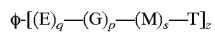

in which φ is or is derived from the residue of said initiator free of said radically transferable group; T is or is derived from said radically transferable group of said initiator; z is independently for each structure at least 1.

26. The block copolymer of claim 25 wherein T is halide.

27. The block copolymer of claim 26 wherein T is derived from a dehalogenation post-reaction.

28. The block copolymer of claim 27 wherein said dehalogenation post-reaction comprises contacting said polymeric flow control agent with a limited radically polymerizable ethylenically unsaturated compound.

29. The block copolymer of claim 28 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

* * * * *

UNITED STATES PATENT AND TRADEMARK OFFICE
CERTIFICATE OF CORRECTION

PATENT NO. : 6,288,173 B1
DATED : September 11, 2001
INVENTOR(S) : Schimmel et al.

It is certified that error appears in the above-identified patent and that said Letters Patent is hereby corrected as shown below:

Column 22,
Line 1, delete the word "bet-hydroxy" and insert -- beta-hydroxy --;
Line 8, delete the claim number "10" and insert -- 20 --; and
Line 60, insert -- amount -- after the word "minor".

Signed and Sealed this

Twenty-seventh Day of August, 2002

*Attest:*

*Attesting Officer*

JAMES E. ROGAN
*Director of the United States Patent and Trademark Office*